United States Patent [19]
Suzuki

[11] Patent Number: 5,907,722
[45] Date of Patent: *May 25, 1999

[54] VISUAL AXIS DETECTION METHOD

[75] Inventor: Kenji Suzuki, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/771,283

[22] Filed: Dec. 20, 1996

Related U.S. Application Data

[63] Continuation of application No. 08/357,784, Dec. 16, 1994, abandoned, which is a continuation of application No. 08/139,806, Oct. 22, 1993, abandoned.

[30] Foreign Application Priority Data

Oct. 30, 1992 [JP] Japan .................................. 4-316565

[51] Int. Cl.$^6$ .................................................. G03B 13/02
[52] U.S. Cl. .............................................................. 396/51
[58] Field of Search .................................................. 396/51

[56] References Cited

U.S. PATENT DOCUMENTS

| | | | |
|---|---|---|---|
| 4,274,735 | 6/1981 | Tamura et al. | 354/403 |
| 4,387,974 | 6/1983 | Marshall et al. | 351/210 |
| 4,742,396 | 5/1988 | Bell . | |
| 4,836,670 | 6/1989 | Hutchinson | 351/210 |
| 5,016,282 | 5/1991 | Tomono et al. | 382/2 |
| 5,036,347 | 7/1991 | Tsunekawa et al. | 354/219 X |
| 5,260,734 | 11/1993 | Shindo | 354/219 |
| 5,408,292 | 4/1995 | Kumakura | 354/410 |

FOREIGN PATENT DOCUMENTS

| | | |
|---|---|---|
| 4037908 | 6/1991 | Germany . |
| 61-61135 | 3/1986 | Japan . |
| 2264632 | 10/1990 | Japan . |
| 1265878 | 3/1972 | United Kingdom . |
| 2125649 | 3/1984 | United Kingdom . |
| 2125651 | 3/1984 | United Kingdom . |

*Primary Examiner*—W. B. Perkey
*Attorney, Agent, or Firm*—Fitzpatrick, Cella, Harper & Scinto

[57] ABSTRACT

An accumulation-type image pickup device having first and second accumulation periods receives light relfected from an eye illuminated by a light beam from an illumination device. A memory for storing a signal from the image pickup device stores an image signal of the eye generated in one of the two accumulation periods of the image pickup device. The illumination device emits light in only one of the two accumulation periods. A differential signal generation circuit generates a differential signal between an image signal generated by the image pickup device during the first accumulation period and an image signal generated in the second accumulation period. The visual axis of the eye is determined on the basis of the signal from the differential signal generation circuit.

3 Claims, 8 Drawing Sheets

VISUAL AXIS DETECTION METHOD

This application is a continuation of application Ser. No. 08/357.784, filed Dec. 16, 1994, now abandoned, which is a continuation of application Ser. No. 08,139,806 filed Oct. 22, 1993, now abandoned.

BACKGROUND OF THE INVENTION

1. Field of the Invention

The present invention relates to a visual axis detection apparatus, and especially to a visual axis detection apparatus which detects an axis in an observation point direction of a viewer (photographer) or a so-called visual axis when the viewer observes an observation plane (imaging plate) on which an object image is formed by a photographing system in an optical system such as a camera, by utilizing a reflected image (eyeball image) formed when an eyeball of the viewer is illuminated with an infrared ray.

2. Related Background Art

Various visual axis so as detection apparatuses for detecting the visual axis to detect a position on a view plane which the viewer (examined person) views have been proposed.

For example, in Japanese Laid-Open Patent Application No. 2-264632, an infrared light beam from a light source is projected to an anterior part of the eye in an eye to be examined and an axis of vision (observation point) is determined by utilizing a cornea reflected image on the basis of light reflected from a cornea and a focus-imaging point on a pupil.

In a camera disclosed in Japanese Laid-Open Patent Application No. 61-61135, a the direction of metering by a focus detection apparatus is mechanically controlled on the basis of an output signal from a visual axis detection means to adjust a focal point state of a photographing system.

Figure 5:
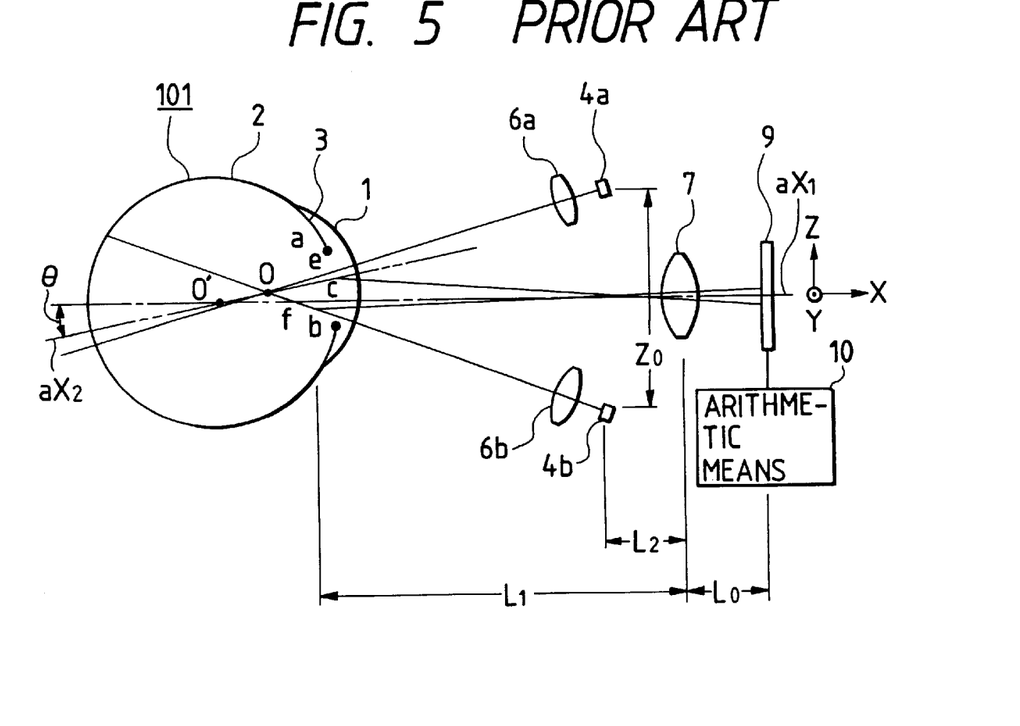
FIG. 5 shows a main schematic view of a conventional visual axis detection apparatus.
Figure 6:
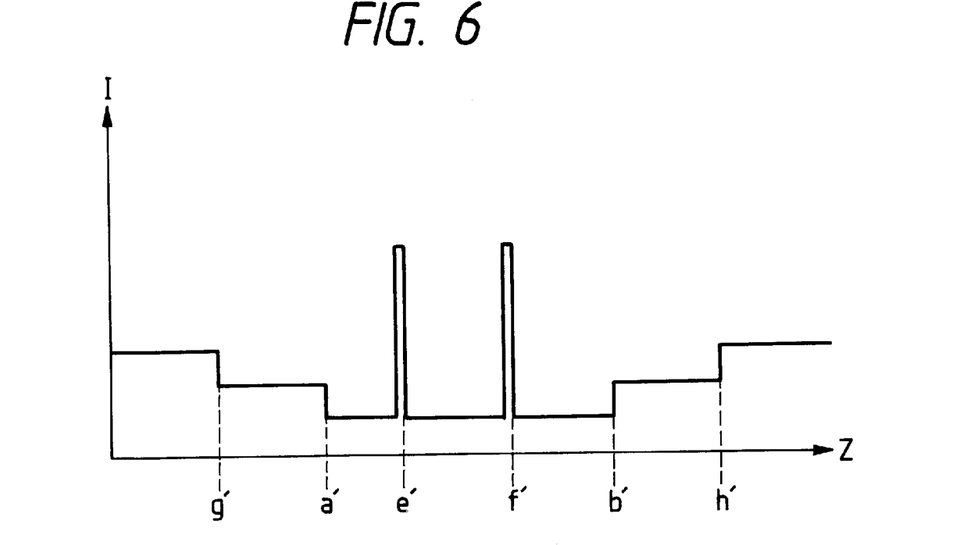
FIG. 6 shows a graph of the output signal from the image sensor in FIG. 5.
Figure 7:
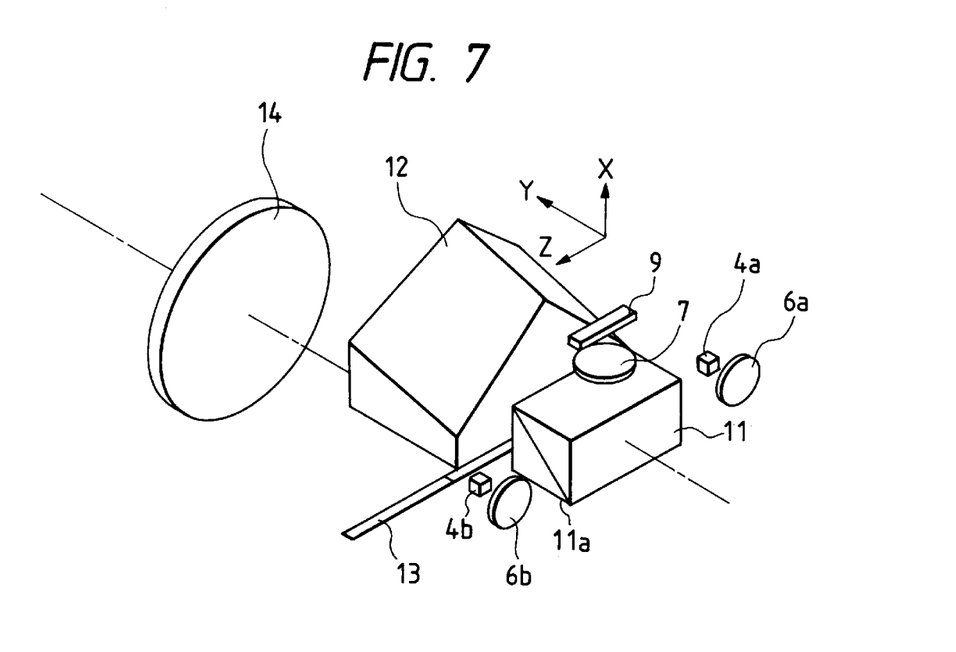
FIG. 7 shows a main schematic view when the visual axis detection apparatus is applied to a single reflex camera.

FIG. 5 is a schematic view of a visual axis detection apparatus proposed in Japanese Laid-Open Patent Application No. 2-264632, FIG. 6 is a graph of an output signal from one line of an image sensor of FIG. 5, and FIG. 7 is a perspective view of a portion of a finder system when the visual axis detection apparatus of FIG. 5 is applied to a single eye reflex camera.

Numeral 101 denotes an eyeball of an examined person (observer), numeral 1 denotes a cornea of the eyeball of the examined person, numeral 2 denotes a sclera, and numeral 3 denotes an iris. O' denotes a center of rotation of the eyeball 101, O denotes a center of curvature of the cornea 1, a and b denote ends of the iris 3, and e and f denote positions where cornea reflected images are formed owing to light sources 4a and 4b to be described hereinafter. Numeral 4a and 4b denote light sources which may be light emitting diodes or the like for emitting infrared rays which are unpleasant for the examined person. The light source 4a (4b) is arranged closer to a projection lens 6a (6b) than to a focal plane of the projection lens 6a (6b). The projection lenses 6a and 6b are applied for widely illuminating the cornea 1 defining a light beam from the light sources 4a and 4b as diverged light beam.

The light source 4a lies on an optical axis of the projection lens 6a and the light source 4b lies on an optical axis of the projection lens 6b, and they are arranged symmetrically along a z-axis direction with respect to an optical axis $aX_1$.

Numeral 7 denotes a light receiving lens which forms the cornea reflected images e and f formed near the cornea 1 and the ends a and b of the iris 3 on an image sensor plane 9. Numeral 10 denotes an arithmetic means which calculates the visual axis of the examined eye by using the output signal from the image sensor 9. $aX_1$ denotes an optical axis of the light receiving lens 7 and it matches the X axis in FIG. 5. $aX_2$ denotes an optical axis of the eyeball which makes an angle θ with respect to the X axis.

In this example, the infrared ray emitted from the light source 4a (4b) passes through the projection lens 6a (6b) and thereafter widely illuminates the cornea 1 of the eyeball 101 in a diverging state. The infrared ray which passes through the cornea 1 illuminates the iris 3.

The cornea reflected images e and f based on the light beam reflected by the surface of the cornea 1 of the infrared rays for illuminating the eyeball are reformed at points e' and f' on the image sensor 9 through the light receiving lens 7. In FIGS. 5 and 6, e' and f' denote projection images of the cornea reflected image (virtual images) e and f formed by a set of light sources 4a and 4b. The centers of the projection images e' and f' substantially match to the projection point on the image sensor 9 of the cornea reflected image formed when the illumination means is arranged on the optical axis $aX_1$.

The infrared ray which is diffusion-reflected by the surface of the iris 3 is directed to the image sensor 9 through the light receiving lens 7 to form the iris image.

On the other hand, the infrared ray transmitted through the pupil of the eyeball to illuminate a retina has the wavelength of the infrared range and the illuminated area is an area of a low view cell density which is apart from a center area, so that the examined person cannot recognize the light sources 4a and 4b.

The ordinate in FIG. 6 represents an output I along the z-axis direction of the image sensor 9. Since most of the infrared rays transmitted through the pupil are not reflected back, there is no difference in the output at the boundary between the pupil and the iris 3. As a result, the iris images a' and b' at the ends of the iris can be detected.

Figure 8:
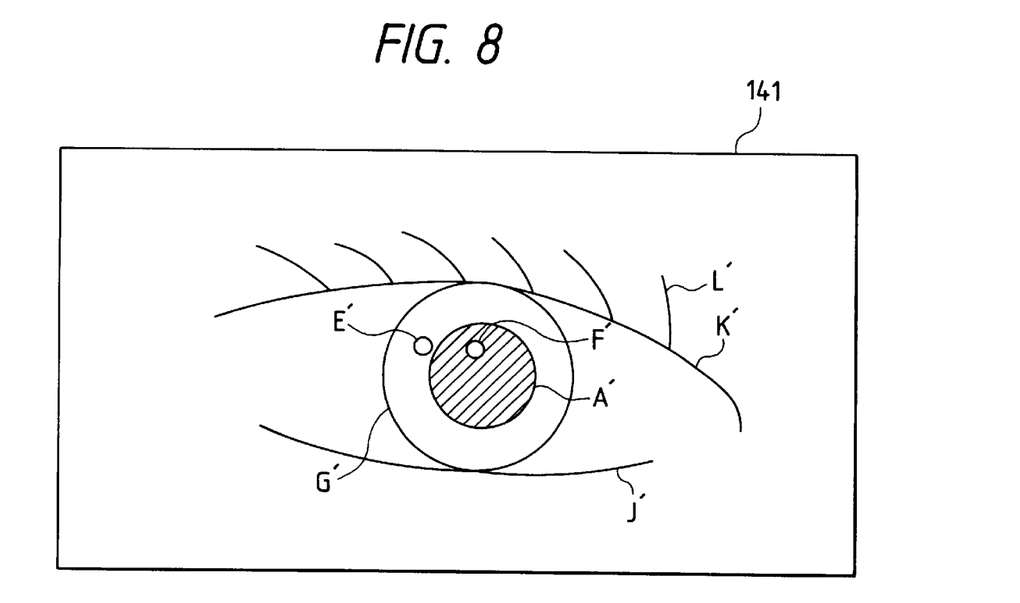
FIG. 8 shows an eyeball image formed on an area sensor.

When an area sensor having a two-dimensional photo-sensor array is used as the image sensor 9 of FIG. 6, two-dimensional light distribution information of the reflected image (eyeball image) is obtained from the front eye as shown in FIG. 8.

In FIG. 8, numeral 141 denotes a light receiving area of the image sensors, E' and F' denote cornea reflected images of the light sources 4a and. 4b, A' denotes a boundary between the iris and the pupil, and G' denotes a boundary between the sclera 2 and the cornea 1. Since the reflectivities of the sclera 1 and the iris 3 are not substantially different from each other in the infrared range, the boundary G' can not be clearly discriminated by a naked eye. J' denotes an image of a lower eyelid, K' denotes an image of an upper eyelid and L' denotes an image of eyelashes.

In order to detect the direction of the visual axis from the eyeball image of the front part of the eye, it has been known to calculate the relative relation between the cornea reflected images E' and F' (or an intermediate image of E' and F') and the position of the center of pupil. Various methods for determining the center of pupil have been known. For example, an output of one particular line of the image sensor is sampled to calculate a center point of the pupil edge positions a' and b' of FIG. 6. Alternatively, the output information of the area sensor may be used to sample a number of pupil edge points and thereafter determine the center point by a least square approximation.

Optional equipment having a finder system such as a still camera or a video camera is frequently used in out-of-door conditions. When such optical equipment is used out-ofdoors, the eyeball of the photographer is illuminated by an external ray. Thus, an image forming light beam received by the image sensor 9 includes not only the image of the front part of the eye illuminated with the light sources 4a and 4b but also a complex image affected by the disturbance by the external ray.

The external ray causing the most problems is a direct light incident on the front part of the eye from the sun. The energy of sunlight is very strong and includes a large amount same spectrum components as those emitted by the light sources 4a and 4b. Accordingly, it is difficult to fully eliminate the external ray by spectrum means such as a visible ray cut filter.

When the front part of the eye is illuminated by sunlight, a variety of disturbances are generated in the image and the external ray component is stronger than the infrared component. As a result, a pattern (eyeball image) cannot be substantially discriminated. When the external ray exists, the brightness in the pupil which should be at a lowest brightness level of luminescence (between a' and b' in FIG. 6) becomes higher or declines so that the detection of the pupil edges and hence the position of the center of the pupil cannot be correctly determined.

When the neighborhood of the boundary of the sclera and the iris is strongly illuminated, an obscure edge, which inherently seems unclear, rises to the surface or declines therein, so that the pupil edges are misdetected. When the eyelashes grow downward, they are illuminated by the external ray, so that they may be misdetected as the pupil edge. Since the eyelashes extend out of the face in contrast to the eyeball, they are easily subject to the illumination by the external ray.

Such a misdetection occurs not only for the pupil edge but also for the cornea reflected images e and f of the light sources 4a and 4b. When the ends of the eyelashes are directly illuminated by the sunlight, they become strong brilliant points, which are misdetected as the cornea reflected images. When eyeglasses are put, on dust deposited on the eyeglasses may be highlighted.

Besides sunlight, a downwardly directed light having high luminescence and various artificial light sources may form also an external e ray. When eyeglasses are put, on a distance between the eyepiece portion in the finder system and the eyeball generally becomes separated so that the external ray easily enters into the eye. Further, the reflection coming from the lens surfaces of the eyeglasses is adversely affected.

When the visual axis is to be detected by using the image signal from the image sensor, an accumulation-type image sensor is frequently used in view of the sensitivity requirements for the system. As a result, there has been a problem that DC noise elimination by an AC coupling or a period detection system which is usually used in a single sensor cell cannot be used.

SUMMARY OF THE INVENTION

It is an object of the present invention to provide a visual axis detection apparatus for detecting an eyeball image by using accumulation-type image pickup means which reduces the affect of noise due to an external ray and detects the visual axis of the eyeball of the photographer (the examined person) who looks into a finder, by properly setting an accumulation method of the eyeball image (image information) by the image pickup means and a processing method of the image information based on the eyeball image from the image pickup means.

In the visual axis detection apparatus of the present invention, the eyeball of the examined person is illuminated by a light beam coming from illumination means, an eyeball image based on a reflected light from the eyeball is formed on a surface in accumulation-type image pickup means, an image signal from the image pickup means is stored in memory means, and a visual axis of the eye of the examined person is calculated by utilizing the image signal stored in the memory means. The image pickup means has first and second accumulation periods and the memory means stores the image signal of the eyeball generated in one of the two accumulation periods and the illumination means emits a light in one of the two accumulation periods. A difference signal between the image signal from the image pickup means generated in the first accumulation period and the image signal generated in the second accumulation period is determined by differential signal generation means and the visual axis of the examined person is detected based on the signal from the differential signal generation means.

DETAILED DESCRIPTION OF THE PREFERRED EMBODIMENTS

Figure 1:
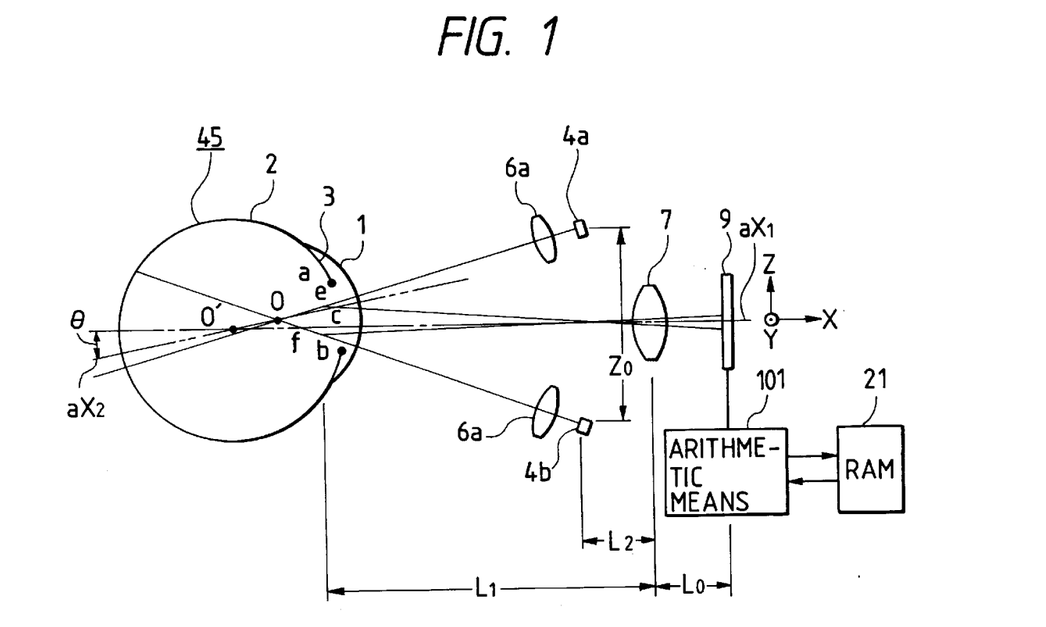
FIG. 1 shows a main schematic view of the first embodiment.
Figure 2:
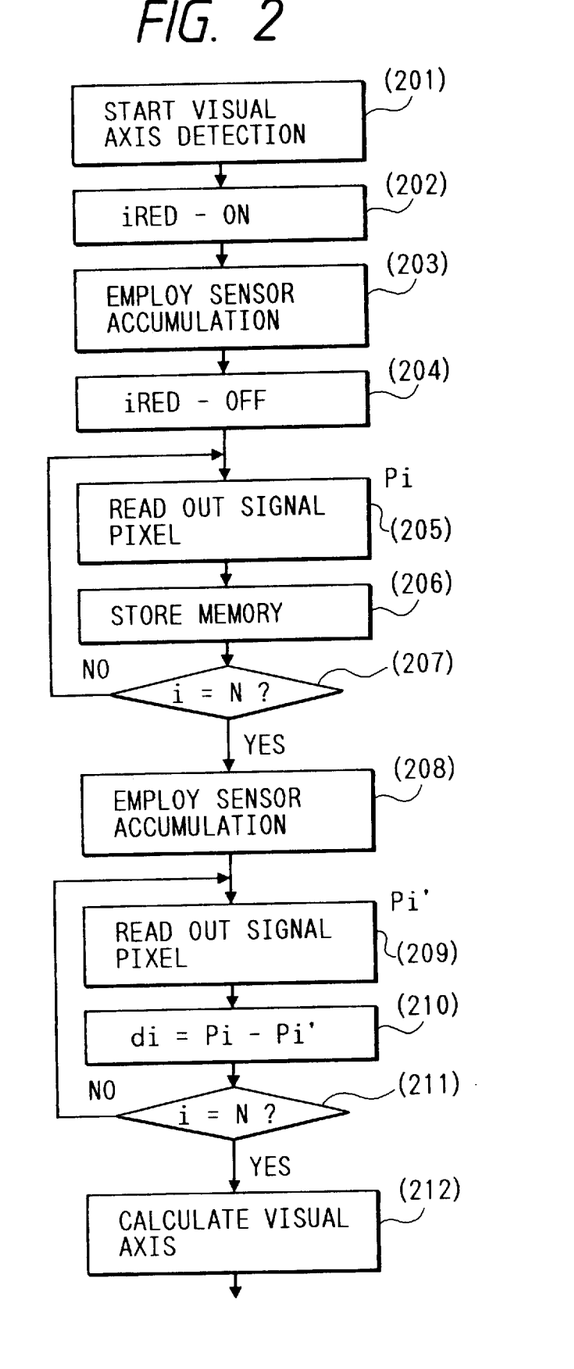
FIG. 2 shows a flowchart of the first embodiment.

FIG. 1 shows a schematic diagram of the first Embodiment of the present invention and FIG. 2 shows a flow chart for explaining the visual axis detection in the first Embodiment.

In the present embodiment, in contrast to the conventional visual detection apparatus of FIG. 5, a photo-electrically converted signal from the image sensor 9 which functions as the accumulation-type image pickup means is processed by arithmetic means 101, and a RAM (memory) 21 for storing the data from the arithmetic means 101 is further provided. Specifically, the visual axis operation method is improved in the arithmetic means 101 by using the data stored in the RAM 21 to eliminate the adverse affects of an external ray.

The elements of the present embodiment are now explained in sequence although it may be partially duplicate the description for FIG. 5.

In FIG. 1, numeral 45 denotes an eyeball of an examined one (viewer), numeral 1 denotes a cornea of the eyeball of the examined one, numeral 2 denotes a sclera and numeral 3 denotes an iris. O' denotes a center of rotation of the eyeball 101, O denotes a center of curvature of the cornea 1, a and b denote ends of the iris 3, and e and f denote positions where cornea reflected images are generated by light sources 4a and 4b to be described hereinafter. Numerals 4a and 4b denote light sources which may be light emitting diodes for emitting infrared rays which are unpleasant to the examined one. The light source 4a (4b) is arranged closer to a projection lens 6a (6b) than to a focal plane of the projection lens 6a (6b). The projection lenses 6a and 6b convert the light beams from the light sources 4a and 4b to diverging lights to widely illuminate on a surface of the cornea 1.

The light source 4a lies on an optical axis of the projection lens 6a while the light source 4b lies on an optical axis of the projection lens 6b and they are arranged symmetrically along a z-axis relative to an optical axis $aX_1$. The light sources 4a and 4b and the projection lenses 6a and 6b form the illumination means.

Numeral 7 denotes a light receiving lens which focuses the cornea reflected images e and f formed in the vicinity of the cornea 1 and the ends a and b of the iris 3 onto the image sensor 9. The light receiving lens 7 and the image sensor 9 form one of the light receiving means which converts the light from the eye into an electrical signal.

Numeral 101 denotes an arithmetic means which calculates the visual axis of the examined person by using the output signal from the image sensor 9, as will be described hereinafter. The basic detection method therefor is described in Japanese Laid-Open Patent Application No. 4-447127. Numeral 11 denotes a RAM which functions as memory means which stores data calculated by the arithmetic means 101. $aX_1$ denotes an optical axis of the light receiving lens 7, which matches an X-axis of a graph of the output of the sensor 9. $aX_2$ denotes an optical axis of the eyeball which makes angle θ with respect to the X axis.

In the present embodiment, the infrared ray emitted from the light source 4a (4b) passes through the projection lens 6a (6b) and thereafter diverges to widely illuminate the cornea 1 of the eyeball 45. The infrared ray transmitted through the cornea 1 illuminates the iris 3.

The cornea reflected images e and f based on the light beam reflected by the surface of the cornea 1, of the infrared rays illuminating the eyeball are reimaged onto the points e' and f' on the image sensor 9 through the light receiving lens 7. In FIGS. 1 and 6, e' and f' denote projection images of the cornea reflected images (virtual images) e and f generated by the set of light sources 4a and 4b. A mid-point of the projection images e' and f' substantially matches the projection position of the cornea reflected image on the image sensor 9, which is generated when the illumination means is arranged on the optical axis $aX_2$.

The infrared ray which is diffusion-reflected by the surface of the iris 3 is introduced into the image sensor 9 through the light receiving lens 7 to form the iris image.

On the other hand, the infrared ray transmitted through the pupil of the eyeball illuminates the retina and is absorbed thereby. However since the illuminated area has a low density of viewing cells which is apart from the center, the examined one cannot discriminate the light sources 4a and 4b.

In FIG. 6, an ordinate represents an output I in the z-axis of the image sensor 9. Since most of the infrared rays transmitted through the pupil are not reflected back, there arises a difference in the outputs at the boundary between the pupil and the iris 3 and the iris images a' and b' of the iris edges are detected.

In the present embodiment, the arithmetic means 101 respectively detects coordinates (Za', Zb' and Ze', Zf') of peculiar points (a', b' and e', f') on the eyeball on the image sensor 9 based on a flow chart of FIG. 2, and calculates a rotation angle θ of the eyeball in accordance with a formula:

$$\beta \cdot \overline{OC} \cdot \sin \theta \cong (Za'+Zb')/2 - (Ze'+Zf')/2$$

where β is a magnification factor of the light receiving optical system ($\cong L_0/L_1$).

A vision angle of the eyeball is determined from the rotation angle θ to determine the subject viewed by the examined one.

In the line of vision detector of the present invention, a distance $L_1$ between the position at which the cornea reflected image is generated and the light receiving lens 7 satisfies the relation:

$$(L_1|Ze'-Zf'|)/L_0 Z_0 \cong \overline{OC}/(L_1-L_2+\overline{OC})$$

where $Z_0$ is a spacing in the z-direction of the set of light sources 4a (4b), and $L_2$ is a spacing in the x direction between the light source 4a (4b) and the light receiving lens 7.

Thus, even if the distance between the line of vision detector and the eyeball changes, the distance $L_1$ may be calculated from the spacing $|Ze'-Zf'|$ of the two cornea reflected images.

The operation of the visual axis detection apparatus is now explained with reference to the flow chart of FIG. 2.

In a step 201, the detection operation of the visual axis starts. In a step 202, the light sources 4a and 4b are turned on and at substantially the same time, the process proceeds to a step 203 to start the first accumulation operation of the image sensor 9. The accumulation by the image sensor 9 may be controlled by comparing a real time accumulation amount motor signal with a predetermined reference, or by time control by a hardware or software timer.

The process proceeds to a step 204 at substantially the end of the first accumulation time of the image sensor to turn off the light sources 4a and 4b. The photo-electric conversion signals of the image sensor 9 are sequentially read through a loop of steps 205–207 and the A/D converted electrical signals Pi of the cells are stored in the memory (RAM) 21. Where the image sensor 9 itself does not have a memory function, the image sensor 9 may sense the light and error-move during reading the signals. Accordingly, the loop is designed to be completed in a sufficiently short time in comparison with the accumulation time.

Where the image sensor 9 includes an analog memory function, the signal charges may be temporarily shifted to the non-photosensitive memory and sequentially read into digital system at a low speed. The memory function of the present embodiment may be implemented as a CCD channel or a capacitor array.

When the reading and storing of all of the required pixels are completed, the process proceeds to a step 208 to conduct the second accumulation operation. The accumulation time of the second accumulation operation is substantially the same as the accumulation time of the first accumulation performed in the step 203.

In the second accumulation operation, the light sources 4a and 4b are not turned on and the front eye image is sampled by only the external ray illumination to cancel the external ray components. In the present embodiment, the accumulation time may be reduced to one half and the read gain may be doubled in order to reduce the accumulation time while keeping the apparent signal quantity.

When the second accumulation operation is finished, the photoelectric conversion signals of the image sensor are sequentially read through a loop of steps 209–211.

Then the arithmetic means 101 reads the signals Pi of the same pixels produced in the first accumulation, calculates differences di between the signals Pi and the current signals Pi' and restores the result in the memory 21.

In the present embodiment, the arithmetic means 101 also includes differential signal generation means for determining the differential signal Pi'. This operation is carried out for all the pixels so that the memory 21 has an image signal based on the eyeball image which substantially eliminates the contribution of the external ray due to the sunlight or the like. In the present embodiment, the direction of the visual axis is calculated in a step 212 based on the above image signal so that any malfunction is prevented and the highly accurate detection of the visual axis is attained.

Figure 3:
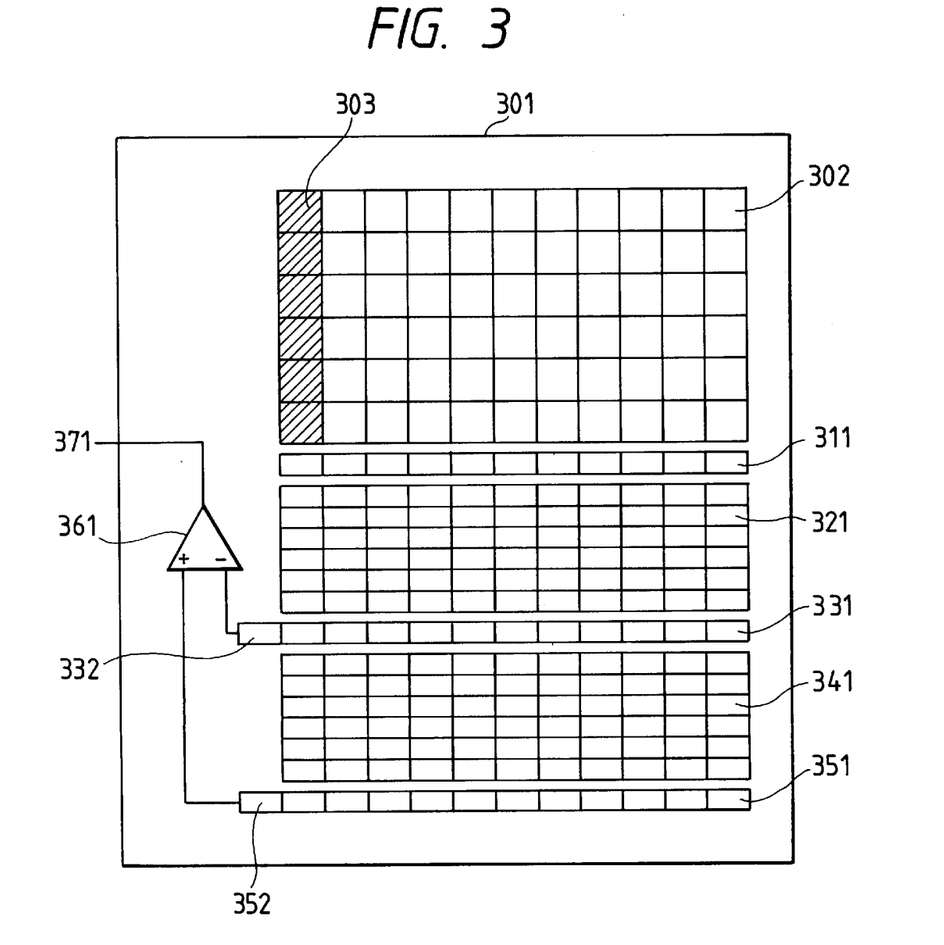
FIG. 3 shows a main schematic view of an image sensor of a second embodiment.
Figure 4:
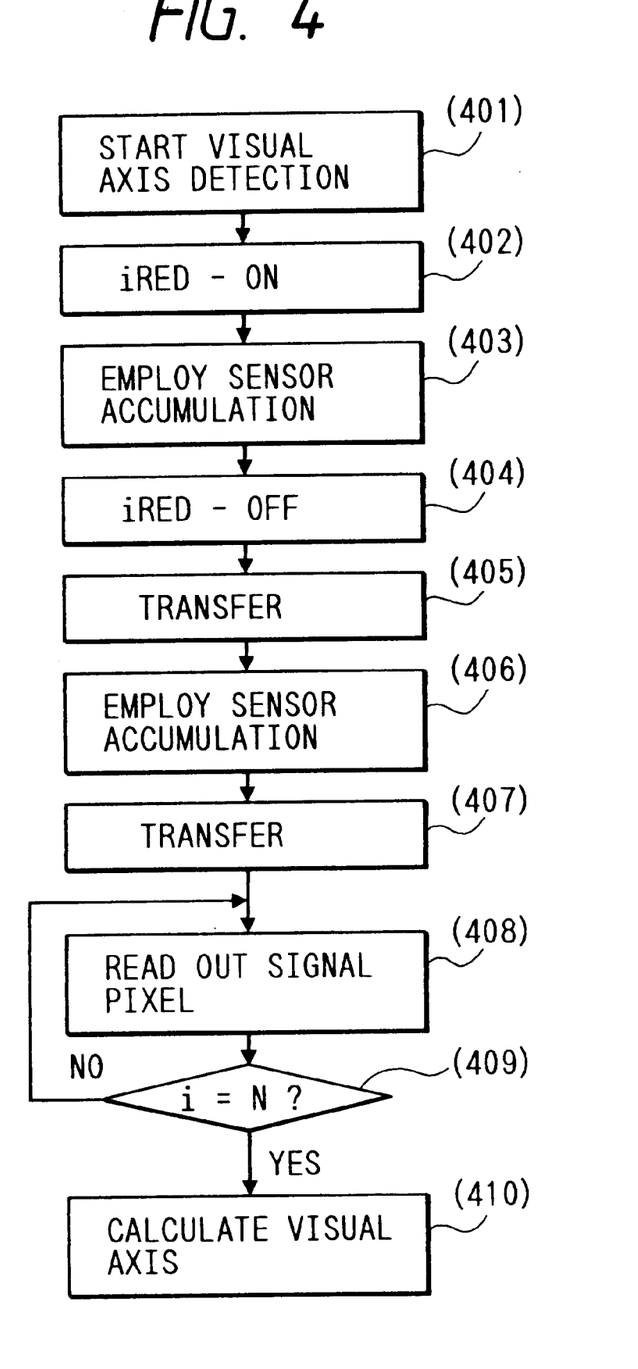
FIG. 4 shows a flowchart of the second embodiment.

FIG. 3 shows a schematic view of an image sensor (a sensor chip) 301 in a second Embodiment of the present invention, and FIG. 4 shows a flow chart of the operation of the present embodiment. Other elements of the present embodiments are substantially identical to those of the first Embodiment.

In FIG. 3, numeral 301 denotes a sensor chip having a well-known self-scanning system and a power supply and the like, and it is shown as a functional block in FIG. 3 for simplification.

The sensor chip 301 is provided at the position of the image sensor 9 in FIG. 1. Numeral 302 denotes a photo-sensing block which is a CCD sensor having M×N areas. FIG. 3 shows a frame-transfer-type system which shares the photo-sensing unit with a transfer unit although the same function may be attained by an interline-type system. A masked column 303 is provided at a left end of the photo-sensitive area. It is a monitor pixel to detect a dark signal level. A transfer buffer 311, a first memory 321, a transfer buffer/horizontal read register 331, a second memory unit 341, a transfer buffer/horizontal read register 351, and a differential amplifier 361 are provided in sequence. The elements other than the photo-sensitive area are fully shielded from the light by an aluminum film or the like.

The operation of the present embodiment is now explained with reference to a flow chart of FIG. 4.

In a step 401, the visual axis detection operation starts. In a step 402, the light sources 4a and 4b are turned on. At substantially same time, the first accumulation operation of the image sensor 301 is started in a step 403, and after employing the accumulation to a predetermined monitor level or after a predetermined time, the accumulation is terminated.

In a step 404, the light sources 4a and 4b are turned off, and in a step 405, the transfer operation is conducted. In the transfer operation, the signal charges accumulated in the photo-sensing unit 302 of the image sensor 301 are transferred to the memory unit 321 through the transfer buffer 311.

The transfer method is well-known. In the illustrated frame-transfer-type system, the signal charges of the pixels are transferred downward one line per one clock signal. The entire image is transferred to the memory unit 321 by (N+1) clock signals including those for the buffer. It is necessary that the time required for the transfer is sufficiently shorter than the accumulation time. In the present embodiment, the transfer rate of the CCD channel is determined by the hardware and it is sufficiently high, so that any problem does not arise.

When the transfer is over, the process proceeds to a step 406 to conduct the second accumulation operation. Since the charges of the photo-sensing unit are evacuated by the previous transfer operation, a reset operation is not necessary but it may be conducted prior to the second accumulation if the circuit is designed to conduct the reset operation.

In the second accumulation, the light sources 4a and 4b are not turned on and the signal charges by only the external ray are accumulated. After completing the accumulation, the process proceeds to a step 407 to conduct the transfer.

In the transfer operation, the signal charges accumulated in the photo-sensing unit 302 are transferred to the memory unit 321 and at the same time the signal charges stored in the memory 321 by the first accumulation are transferred to another memory unit 341. Since they are processed simultaneously and in parallel the signal charges of the two accumulations are not mixed and the transfers are completed by (N+1) clock signals. Finally, the signal charges by the first accumulation are stored in the memory 341 and the signal charges of the second accumulation are stored in the memory 321.

In the next sequence, the signal is read outwardly through a loop of steps 408–409. This sequence may be at a lower speed than the transfer in the sensor chip owing to an external radial circuit but the signal may be read without regard to the sensing by the sensor because the signal charges have been transferred to the light-shielded memory unit.

The signal charges stored in the memory units (321 and 341) are sequentially transferred, pixel by pixel, to the charge-voltage converters 332 and 352 by the function of the horizontal line read registers 331 and 351, and the signal voltages are applied to the input terminals of the differential amplifier 361. Since both horizontal registers 331 and 351 are operated by one clock simultaneously, the signals of the same pixel of the photo-sensing unit 302 produced in the first and second accumulations are simultaneously applied to the positive and negative inputs of the differential amplifier 361. As a result, the image signal which the external ray components is subtracted therefrom appears at the output terminal 371. When it is done for all pixels, the process proceeds to a step 410 to calculate the visual axis. In the present embodiment, the problems caused by the external ray is eliminated in such a manner as to attain a highly reliable signal.

In the present embodiment, a capacitor array may be also used to eliminate the external ray in the sensor chip. An image sensor which temporarily stores the photo-excited image signal charges in the capacitor array through a current amplifier element such as a transistor and thereafter sequentially read them out has been known, and hence the elimination of the external ray which is functionally equivalent to the CCD arrangement described above may be attained.

Only one set of the memory unit may be provided for the first accumulation signal and the second accumulation signal may be subtracted on the chip and the result is output. Alternatively, it may be re-stored in the memory. The significance of the present invention is not limited by the specific details of the implementation.

Figure 9:
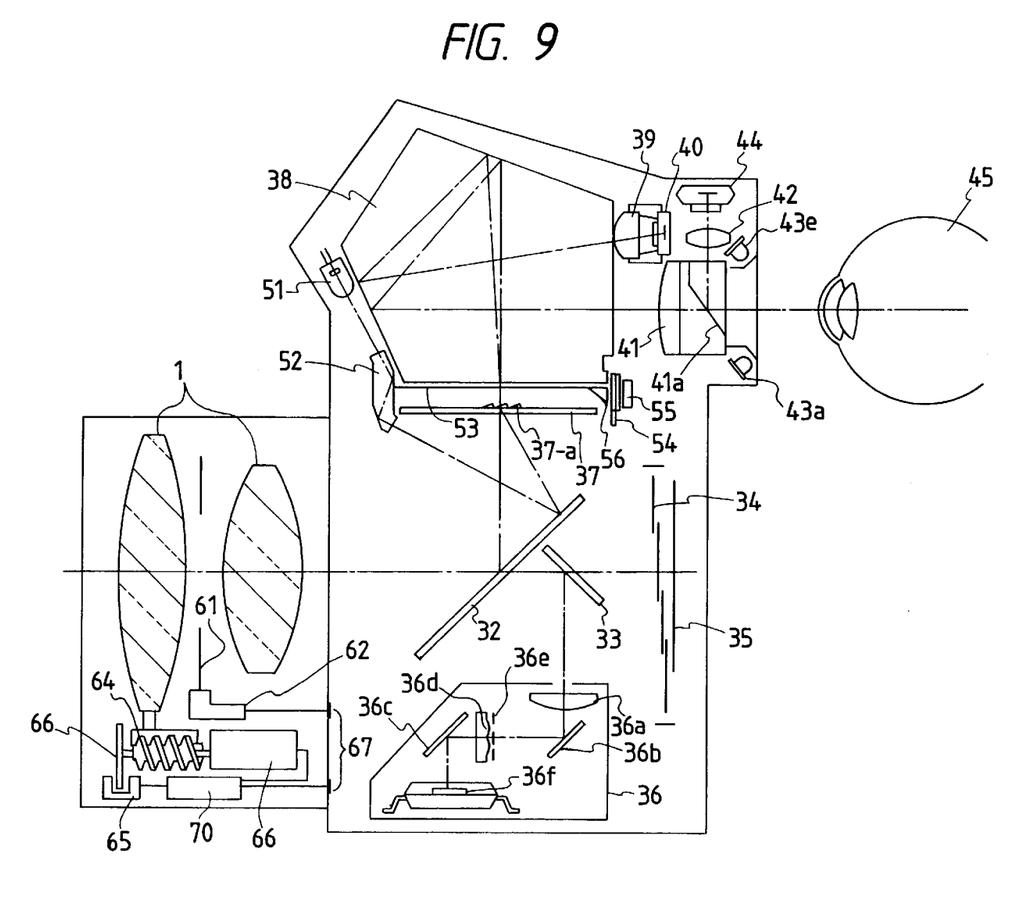
FIG. 9 shows a view when the visual detection apparatus is mounted into a single reflex camera.

FIG. 9 shows a schematic diagram of an embodiment in which the line of vision detector of the present invention is applied to a single reflex camera.

In FIG. 9, numeral 31 denotes a photographing lens which comprises two lenses for the sake of convenience although it actually comprises more lenses. Numeral 32 denotes a main mirror which is skewed into a photographing path or retracted therefrom depending on a view state of an object by a finder system and a photographing state of an object image. Numeral 33 denotes a sub-mirror which reflects a light beam transmitted through the main mirror 32 to a focal point detection apparatus 39 at a bottom of a camera body to be described later.

Numeral 34 denotes a shutter and numeral 35 denotes a photo-sensing member such as a silver salt film, CCD or MOS or the like solid state image pickup device, or an image pickup tube such as a videcon.

Numeral 36 denotes a focal point detection apparatus which comprises a field lens 36a arranged near a focusing plane, reflection mirrors 36b and 36c, a secondary image forming lens 36d, a diaphragm 36e and a line sensor 36f and the like including a plurality of CCD's.

The focal point detection apparatus 36 in the present embodiment uses a well-known phase difference system. Numeral 37 denotes an imaging plate arranged on an anticipated focusing plane of the photographing lens 31, numeral 38 denotes a pentadaha prism for altering a finder optical path, and numerals 39 and 40 denotes an image forming lens and a photometering sensor, respectively, for measuring an brightness of the object in the view field. The focusing lens 39 is conjugate with the imaging plate 37 and the photometering sensor 40 through a reflection optical path in the pentadaha prism 38.

An eyepiece lens 41 having an optical splitter 41a is arranged behind an exit plane of the pentadaha prism 38 and it is used for the observation of the imaging plate 37 by the eye 45 of the photographer. The optical splitter 41a comprises a dichroic mirror which transmits a visible ray and reflects an infrared ray.

Numeral 42 denotes a light receiving lens and numeral 44 denotes an image sensor having two-dimensionally arranged a photo-electric element array such as CCD's as explained above, which is arranged in conjugate to the vicinity of the pupil of the eye 45 of the photographer which is at a predetermined position with respect to the light receiving lens 42 (corresponding to 9 in FIG. 1). Numeral 43 denotes an infrared ray emitting diode which functions as the light source (corresponding to 4 in FIG. 1).

Numeral 51 denotes a high intensity superimposing LED which can be recognized even for a bright object. The emitted light is reflected by the main mirror 32 through the projection lens 52 and vertically deflected by a fine prism array 37a arranged at a display area of the imaging plate 37 and reaches the eye 45 of the photographer through the penta prism 38 and the eyepiece lens 41.

The fine prism arrays 37a are formed. in frame shape at a plurality of points (metering points) corresponding to the focus detection area of the imaging plate 37, and they are illuminated by five corresponding superimposing LED's 51 (which are defined as LED-L1, LED-L2, LED-C, LED-R1 and LED-R2).

Numeral 53 denotes a view field mask which forms a finder view field and numeral 54 denotes an LCD in the finder for displaying photographing information outside of the finder view field. It is illuminated by an illumination LED (F-LED) 55.

The light transmitted through the LCD 54 is introduced into the finder view field by a triangular prism 56 and it is displayed outside of the finder view field so that the photographer may recognize the photographing information.

Numeral 61 denotes a diaphragm provided in the photographing lens 31, numeral 64 denotes an aperture driver including an aperture drive circuit 70 to be described later, numeral 63 denotes a lens drive motor, numeral 64 denotes a lens drive member including drive gears and the like, and numeral 65 denotes a photo-coupler which detects the rotation of a pulse disk 66 coupled to the lens drive member 64 and transmits it to the lens focal point adjusting circuit 70, which drives the lens drive motor based on the information from the photo-coupler 65 and the lens driving amount information from the camera to drive the photographing lens 31 into an in-focus position. Numeral 67 denotes a well-known mount contact point which is an interface to the camera and the lens.

Figure 10:
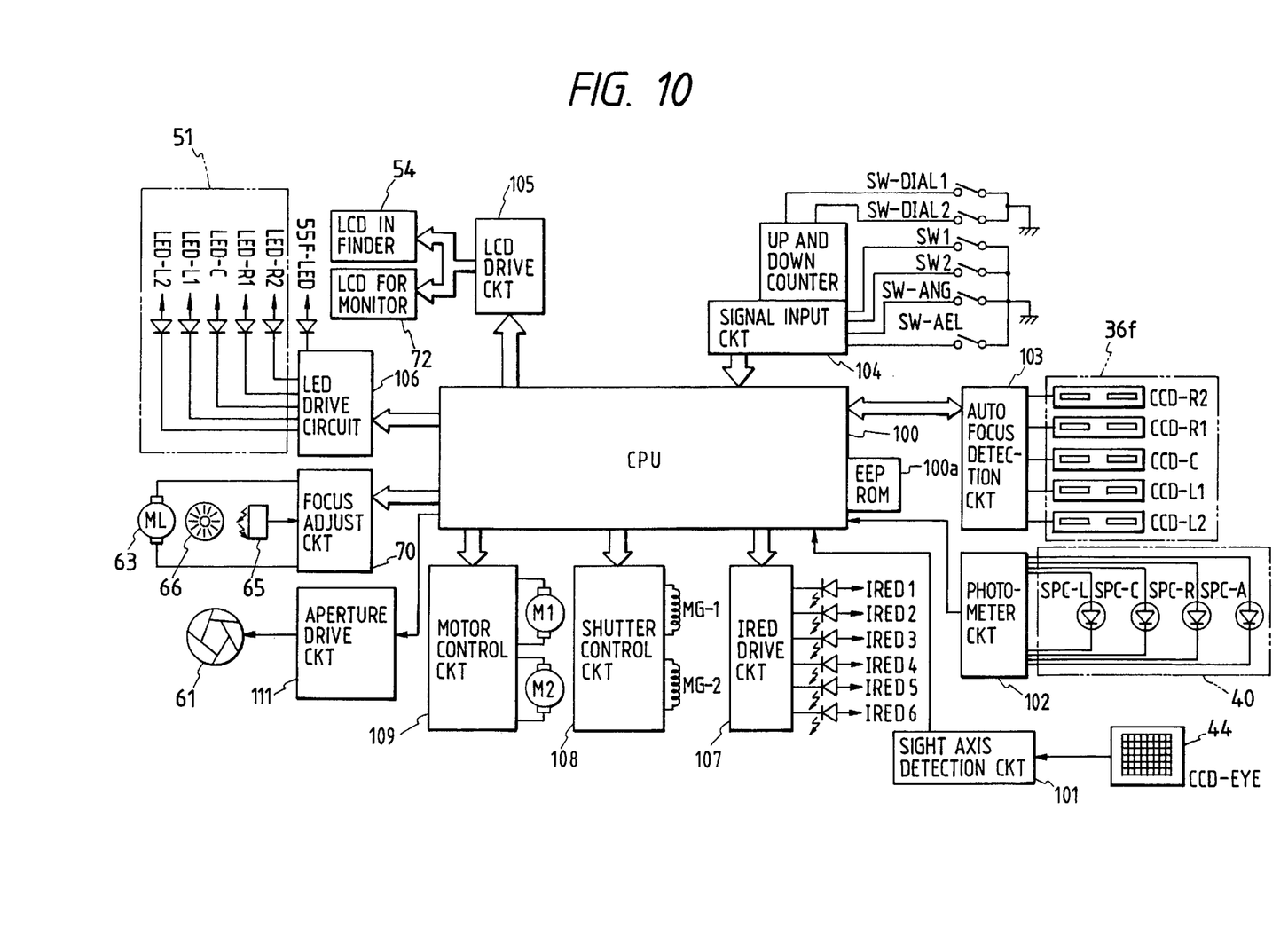
FIG. 10 shows a block diagram for explaining how the apparatus in FIG. 9 is controlled.

FIG. 10 shows an electric circuit built in the camera of the present embodiment, and the like elements to those of FIG. 9 are designated by like numerals.

Connected to a central processing unit (CPU) 100 of a microcomputer built in the camera body are a visual axis detection circuit 101, a photometer circuit 102, an automatic focal point detection circuit 103, a signal input circuit 104, an LCD drive circuit 105, an LED drive circuit 106, an IRED drive circuit 107, a shutter control circuit 108, and a motor control circuit 109. Signals are exchanged with the focus drive circuit 70 and the aperture drive circuit 111 arranged in the photographing lens through the mount contact point 67 shown in FIG. 9.

An EEPROM 100a associated with the CPU 100 has a visual axis correction data memory function for correcting individual differential errors of the visual axis.

As described above, the visual axis detection circuit 101 A/D-converts the output of the eyeball image from the image sensor (CCD-EYE) based on the difference between the output in the illuminated state and the output in the non-illuminated state and sends the image information to the CPU 100, which samples each of the characteristic points of the eyeball image necessary for the detection of the visual axis in accordance with a predetermined algorithm and calculates the visual axis of the photographer based on the positions of the characteristic points.

The photometer circuit 102 amplifies the output from the photometering sensor 40, logarithmically compresses it, A/D-converts it, and sends the output to the CPU 100 as the luminescence information of each sensor. In the present embodiment, the photometering circuit 40 has photo-diodes including SPC-L, SPC-C, SPC-R and SPC-A for photometering four areas.

The line sensor 36 of FIG. 10 is a well-known CCD line sensor including five line sensors CCD-L2, CCD-L1, CCD-C, CCD-R1 and CCD-R2 corresponding to the five metering points in the image.

The automatic focus detection circuit (focal point detection circuit) 103 A/D-converts the voltage obtained from the line sensor 36f and sends it to the CPU 100. SW-1 denotes a switch which is turned on by a first stroke of a release button to start the photometering, the auto-focusing and the detection of the visual axis, SW-2 denotes a release switch which is turned on by a second stroke of the release button, SW-AEL denotes an AE lock switch which is turned on by depressing an AE lock button, and SW-DIAL1 and SW-DIAL2 denote dial switches provided in an electronic dial (not shown) which are connected to an up/down counter of the signal input circuit 104 to count on rotation clicks of the electronic dial.

Numeral 105 denotes a well-known LCD drive circuit for driving the liquid crystal display element LCD. It can display the aperture value, the shutter speed and the preset photographing mode on the monitor LCD 72 and the LCD 54 in the finder simultaneously in accordance with the signal from the CPU 100. The LED drive circuit 106 turns on and off the illumination LED (F-LED) 55 and the superimposing LED 51. The IRED drive circuit 107 selectively turns on the infrared ray emitting diodes (IRED1–6) according to surrounding states.

The shutter control circuit 108 controls a magnet MG-1, which, when actuated, drives a leading curtain, and a magnet MG-2 which drives a trailing curtain, to impart a predetermined amount of light exposure to a photosensitive member. The motor control circuit 109 controls a motor M1 which winds up and rewinds a film, and a motor M2 which charges the main mirror 32 and the shutter 34. The shutter control circuit 108 and the motor control circuit 109 carry out a series of camera release sequence.

In detecting the visual axis, the eyeball of the subject is illuminated by the light beam from the illumination means 43, the eyeball image is formed on the accumulation type image pickup means 44 based on the reflected light from the eyeball, the image signal from the image pickup means is stored in the memory means 21 (RAM) (FIG. 1), and the visual axis of the subject is calculated by using the image signal stored in the memory means. The image pickup means has first and second accumulation periods, the memory means stores the image signal of the eyeball image generated in one of the two accumulation periods, and the illumination means emits light in only one of the two accumulation periods. A difference signal between the image signal from the image pickup means generated in the first accumulation period and the image signal generated in the second accumulation period is determined by the differential signal generation means and the line of vision of the subject is detected by using the signal from the differential signal generation means. The high luminescence LED 51 illuminates the point based on the calculated visual axis information and the focus is detected by the focal point detection circuit 103 for the object area corresponding to the illumination point and the photographing lens 31 is driven by the focal point adjusting circuit 70.

In accordance with the present invention, when the eyeball image is to be detected by using the accumulation type image pickup means, the effect of noise due to external rays is reduced by properly installing the accumulation method of the eyeball image (image information) by the image pickup means and the processing method of the image information based on the eyeball image from the image pickup means so that the visual axis detection apparatus which can accurately detect the visual axis of the eyeball of the photographer (the examined person) who views the finder.

What is claimed is:

1. A visual axis detection apparatus comprising:

illumination means for illuminating the eye;

a single conversion means, comprising a plurality of pixels arranged over an area, for converting light from an eye of an examined person a first electrical signal when the eye is illuminated by said illumination means and for converting light from the eye of the examined person to a second electrical signal in the absence of illumination of the eye by said illumination means;

signal generation means for generating a signal representing the difference between the first electrical signal and the second electrical signal of said single conversion means by obtaining the difference between outputs of the same pixel during the presence and absence of illumination of the eye;

detection means for detecting a visual axis of the eye on the basis of the signal of said signal generation means; and memory means for storing the electrical signal produced by said conversion means in the state where the eye is illuminated by said illumination means, and wherein said signal generation means outputs a signal which is the difference between the an electrical signal produced by said conversion means in the absence of illumination and the signal stored in said memory means.

2. A visual axis detection apparatus comprising:

illumination means for illuminating the eye;

a single conversion means, comprising a plurality of pixels arranged over an area, for converting light from an eye of an examined person a first electrical signal when the eye is illuminated by said illumination means and for converting light from the eye of the examined person to a second electrical signal in the absence of illumination of the eye by said illumination means;

signal generation means for generating a signal representing the difference between the first electrical signal and the second electrical signal of said single conversion means by obtaining the difference between outputs of the same pixel during the presence and absence of illumination of the eye;

detection means for detecting a visual axis of the eye on the basis of the signal of said signal generation means; and, wherein said conversion means includes a frame transfer-type solid state image pickup means having a first memory and a second memory, wherein said first memory stores the electrical signal of said conversion means in the state where the eye is illuminated by said illumination means, and said second memory stores the electrical signal of said conversion means in the absence of illumination.

3. A visual axis detecting means comprising:

illumination means for illuminating the eye;

photoelectric conversion means provided with a plurality of pixels, each pixel of said photoelectric conversion means converting a light beam reflected from the eye into an electrical signal;

memory means for storing at least one of the electrical signal of each pixel of said photoelectrical conversion means when said illuminating means illuminates the eye and for storing the electrical signal of each pixel of said photoelectrical conversion means when said illuminating means does not illuminate the eye; and calculation means for calculating data on a visual axis of the eye based on the difference between each of the electrical signals produced by said photoelectrical conversion means when said illuminating means illuminates the eye and each of the electrical signals produced by said photoelectrical conversion means when said illuminating means does not illuminate the eye, at least one of which has been already stored in said memory means.

\* \* \* \* \*

UNITED STATES PATENT AND TRADEMARK OFFICE
CERTIFICATE OF CORRECTION

PATENT NO. : 5,907,722

DATED : May 25, 1999

INVENTOR(S) : Kenji Suzuki

It is certified that error appears in the above-identified patent and that said Letters Patent is hereby corrected as shown below:

Column 12, line 46, delete "for storing".

Signed and Sealed this

Third Day of August, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,907,722

DATED : May 25, 1999

INVENTOR(S): KENJI SUZUKI

It is certified that error appears in the above-identified patent and that said Letters Patent is hereby corrected as shown below:

<u>COVER PAGE AT ITEM [57], ABSTRACT</u>:
Line 2, "relflected" should read -reflected-.

<u>COLUMN 1</u>:
Line 4, "08/357.784," should read -08/357,784,-;
Line 21, "so as" should be deleted;
Line 22, "axis" should read -axis so as-; and
Line 32, "a the" should read -the-.

<u>COLUMN 2</u>:
Line 47, "sclera 1" should read -sclera 2-; and
Line 65, "optional" should read -optical-.

<u>COLUMN 3</u>:
Line 10, "same" should read -of the same-;
Line 38, "put, on" should read -put on,-;
Line 42, "e ray." should read -ray.-, "put, on" should read -put on,-, and "a distance" should read -the distance-.

UNITED STATES PATENT AND TRADEMARK OFFICE
CERTIFICATE OF CORRECTION

PATENT NO. : 5,907,722

DATED : May 25, 1999

INVENTOR(S): KENJI SUZUKI

It is certified that error appears in the above-identified patent and that said Letters Patent is hereby corrected as shown below:

COLUMN 4:
Line 7, "a visual" should read -the visual-; and
Line 58, "be" should be deleted.

COLUMN 7:
Line 43, "same" should read -the same-.

COLUMN 8:
Line 14, "by the" should read -of the-;
Line 35, "is" should read -are-; and
Line 39, "is" should read -are-.

COLUMN 9:
Line 9, "CCD's." should read -CCDs.-;
Line 16, "an" should be deleted;
Line 29, "CCD's." should read -CCDs.-;
Line 30, "in" should be deleted;
Line 43, "formed." should read -formed-; and
Line 46, "LED's" should read -LEDs-.

UNITED STATES PATENT AND TRADEMARK OFFICE
CERTIFICATE OF CORRECTION

PATENT NO. : 5,907,722

DATED : May 25, 1999

INVENTOR(S): KENJI SUZUKI

It is certified that error appears in the above-identified patent and that said Letters Patent is hereby corrected as shown below:

COLUMN 11:
Line 46, "person" should read -person to-.

COLUMN 12:
Line 5, "the an" should read -the-; and
Line 12, "person" should read -person to-.

Signed and Sealed this

Fifteenth Day of February, 2000

Attest:

Attesting Officer

Q. TODD DICKINSON

Commissioner of Patents and Trademarks